United States Patent

[11] 3,608,035

[72] Inventor Alfons Fröhlich
 Essen, Germany
[21] Appl. No. 846,882
[22] Filed Aug. 1, 1969
[23] Division of Ser. No. 620,972, Mar. 6, 1967, Pat. No. 3,490,098
[45] Patented Sept. 21, 1971
[73] Assignee Firma Opti-Holding AG.
 Glarus, Switzerland
[32] Priority Mar. 5, 1966
[33] Germany
[31] 0-11,496

[54] METHOD OF MAKING SLIDE FASTENERS
 10 Claims, 25 Drawing Figs.
[52] U.S. Cl. .................................................. 264/146,
 18/1 Z, 18/12 TS, 18/13 H, 264/166, 264/174, 264/274
[51] Int. Cl. ........................................ B28b 11/16,
 B29d 5/00, B29f 3/10
[50] Field of Search .......................................... 264/177,
 174, 171, 166, 167, 165, 242, 247, 145, 274, 146,
 149, 150; 18/13 H, 13 P, 13 M, 13 K, 13 A, DIG.
 34, 12 DM, 14 C, 1 Z, 12 TS

[56] References Cited
UNITED STATES PATENTS
| 2,424,047 | 7/1947 | Morin | 264/161 |
| 2,791,807 | 5/1957 | Morin | 264/171 |
| 3,196,196 | 7/1965 | Burbank | 264/167 |
| 3,270,408 | 9/1966 | Nealis | 264/320 |
| 3,445,915 | 5/1969 | Cuckson et al. | 264/174 |

Primary Examiner—Robert F. White
Assistant Examiner—Jeffery R. Thurlow
Attorney—Karl F. Ross ABSTRACT: Method of making slide-fastener coupling elements wherein a flat (metallic or Teflon) die strip, having laterally open cutouts along its longitudinal edges with a spacing corresponding to the spacing of the heads of the coupling element and corresponding configuration, is passed through an extruder and continuously encased in a synthetic resin which, when hardened is cut away along at least one broad surface of the die strip to release the latter. The die strip has laterally extending projections; a cruciform section, and may be used in pairs to form rows of coupling members on opposite sides of a web onto which the coupling elements are molded. Formations prevent lateral transverse dislocation of the coupling elements when they are interconnected by a slider, e.g. a pair of strips flanking the female coupling members, a central rib flanked by the head of the mating coupling member, or ridges formed in one of the coupling elements and fitting into the complementary part of the mating slide-fastener element. Apparatus for making the slide fastener including means for returning the die strip to the extrusion head, a worm type plastifying means for supplying the synthetic resin and endless bands for masking the fabric as it is advanced through the extrusion die.

INVENTOR.
Alfons Fröhlich
BY
Karl J. Ross
Attorney

INVENTOR.
Alfons Fröhlich
BY
Karl F. Ross
Attorney

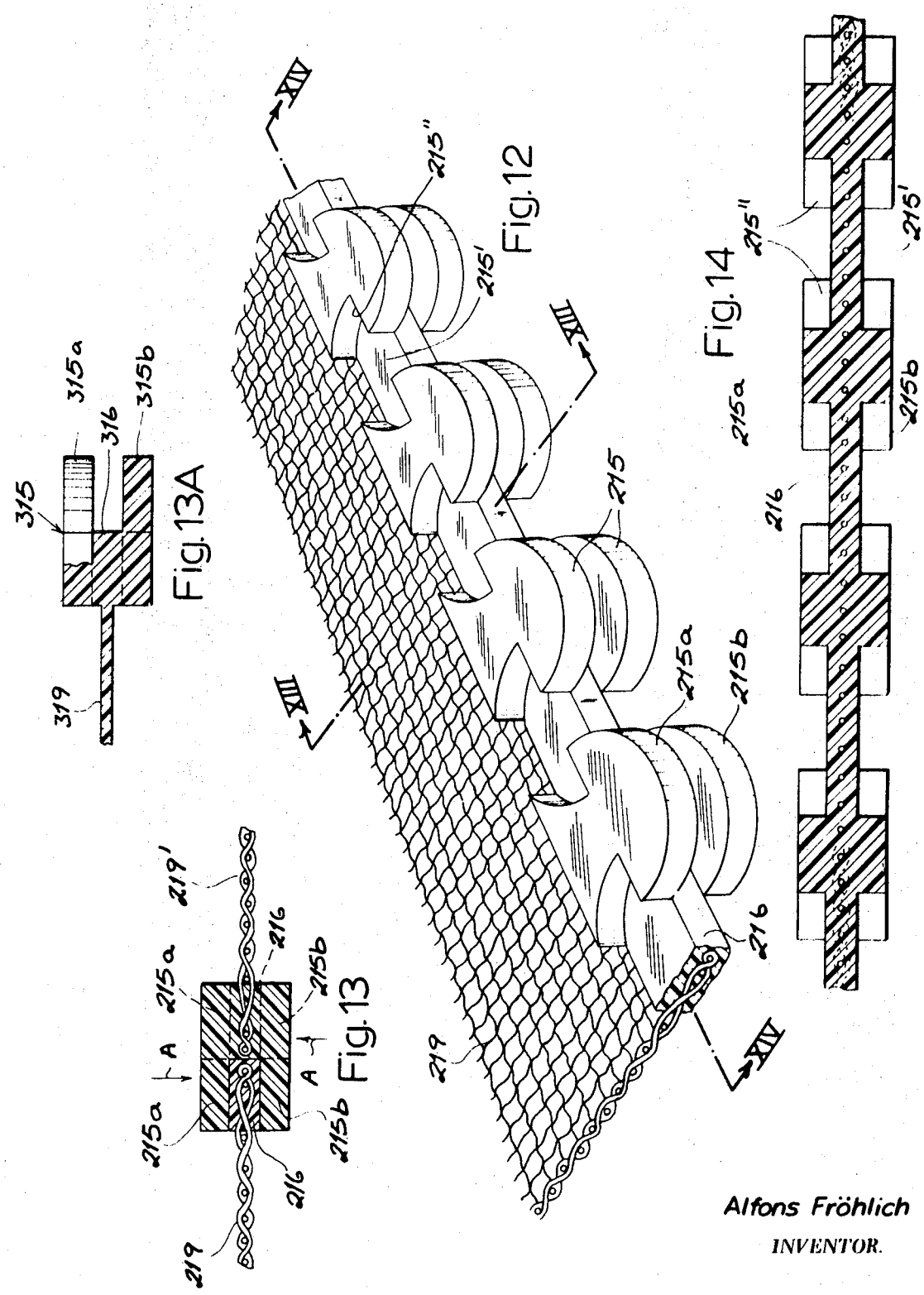

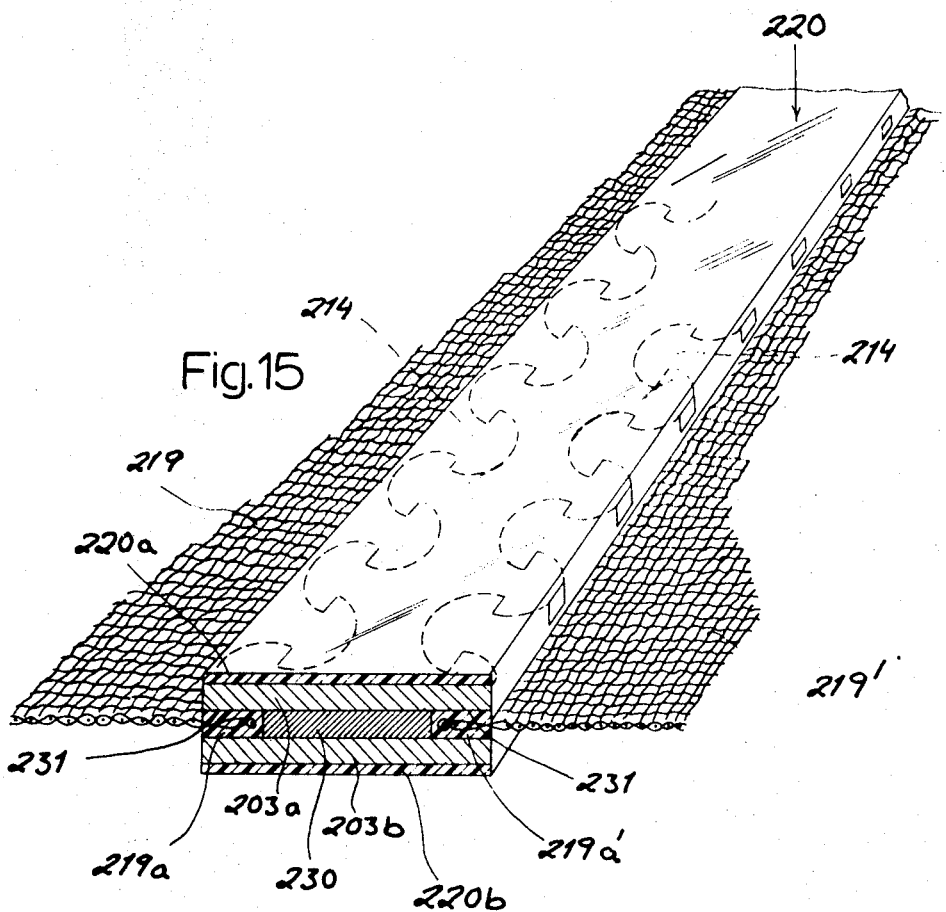
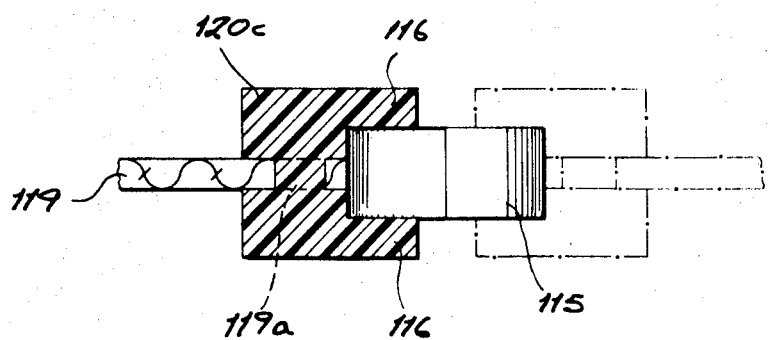

Alfons Fröhlich
INVENTOR.

BY Karl F. Ross
Attorney

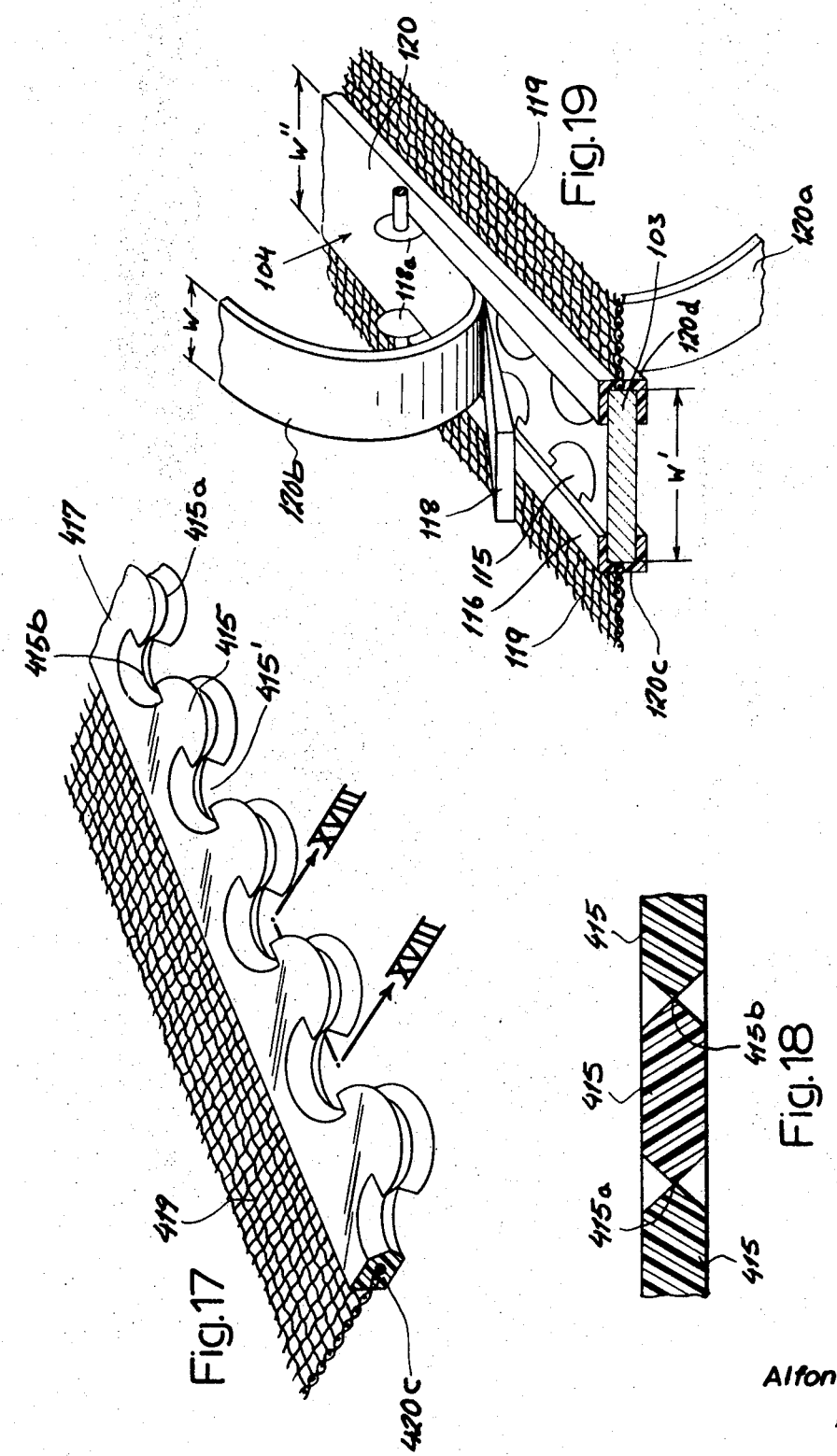

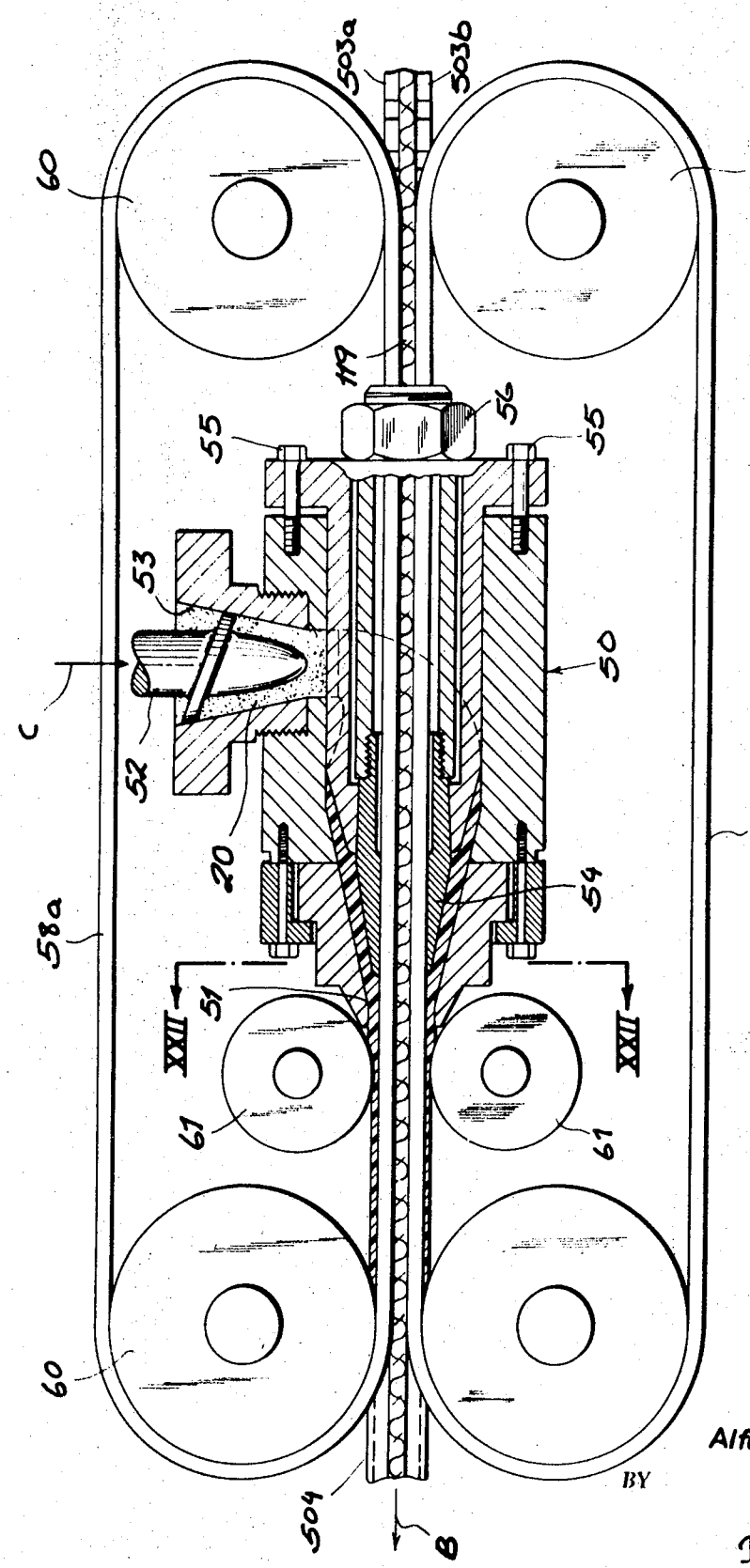

INVENTOR.
Alfons Fröhlich
BY
Karl F. Ross
Attorney

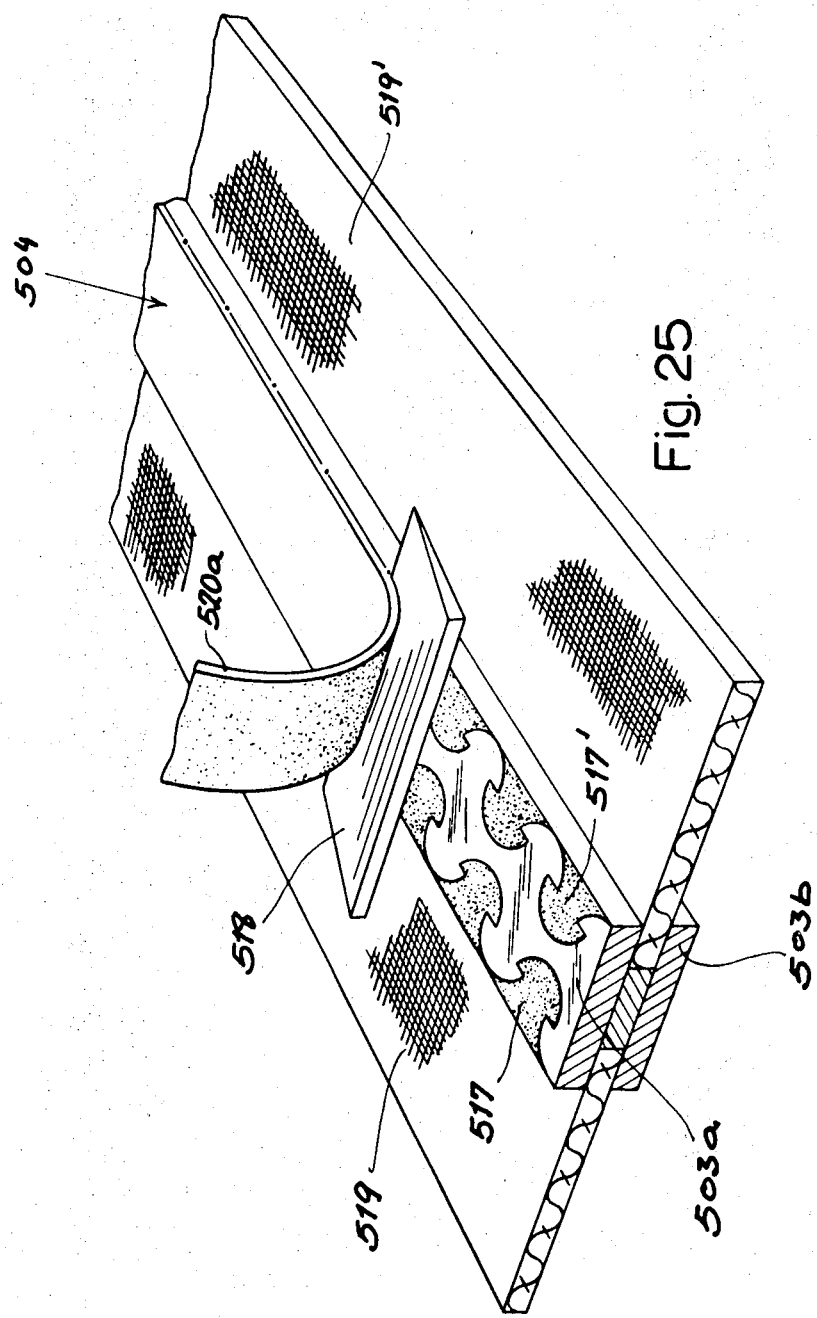

3,608,035

METHOD OF MAKING SLIDE FASTENERS

This application is a division of my application Ser. No. 620,972 filed 6 Mar. 1967 (now U.S. Pat. No. 3,490,098).

My present invention relates to a method of producing slide-fastener assemblies wherein a pair of slide-fastener halves are each formed with a respective support tape or band, e.g. a fabric strip or a synthetic-resin foil, provided along a longitudinal edge with a coupling element whose spaced-apart heads are interengageable with the spaced-apart head of a complimentary slide fastener half; the invention also relates to slide-fastener assemblies made by the improved method of this invention as well as to coupling elements usable in such assemblies.

Slide-fastener assemblies having synthetic-resin coupling elements affixed to or disposed along a longitudinal edge of the respective support tape have already been proposed in a multitude of configurations. Of late, it has been found to be especially convenient to provide the coupling element as a continuous member of helicoidal or meandering configuration. Coupling elements of this type are unitarily formed along the entire length of the coupling element and are provided with heads by pressing in dies, by the coiling of a synthetic-resin filament or a like technique. Suitable filaments for these purposes are polyamides of the nylon type and polyesters, such filamentary materials having considerable thermal and mechanical stability. Because they are composed of synthetic resin and have coupling heads with relatively close spacing, these slide fasteners are desirable and have been preferred for many applications and tend to be snag-free, unaffected by rigorous washing and cleaning operations, and devoid of the problems involving earlier metallic chains of coupling. The continuous synthetic-resin coupling elements formed from monofilamentary plastics are generally attached to the support band or tape by adhesive technique, by welts or chain stitching or the like. These techniques have been found to be disadvantageous in many respects since they require skilled labor, or necessitate complex apparatus. Furthermore, attempts to overcome these disadvantages by discontinuously injection-molding synthetic resin in multipartite dies were found to be incapable of maintaining the fine spacing of the heads, of precisely forming the heads, and of permanently and firmly joining the coupling elements with the support band.

It is, therefore, the principal object of the present invention to provide an improved method of forming precisely dimensioned and uniformly spaced coupling elements suitable for use in slide-fastener assemblies.

A further object of this invention is to provide a method of producing coupling elements for slide fasteners in an economical, convenient and rapid manner.

Another object of this invention is to provide a method of forming slide-fastener halves in which a continuous coupling element is integrally bonded to a support band and the configuration of the resulting element is particularly convenient for the intimate joining of the halves.

Another object of the present invention is to provide an improved coupling element for use in slide fasteners of the character described.

Still another object of my invention is to provide a slide-fastener assembly and component parts thereof of economical manufacture, of accurate and reproducible dimensioning, and of high resistance to breakage and damage.

I have now found that these objects can be attained and the production of coupling elements for slide fasteners can be accelerated and coupling elements of high quality produced when the coupling element is formed by feeding a continuous die strip through an extrusion nozzle, the die strip having a row of laterally open cutouts (i.e. cavities) whose configurations are complementary to those of the heads of the coupling element to be formed and whose spacing corresponds precisely to the desired spacing of the coupling heads, and extruding into these cavities and around the die strip a thermoplastic synthetic resin which, when cooled, is separated from the die strip to yield a coupling element of the character indicated.

The relatively thin die strip, whose thickness corresponds to the thickness of the heads to be produced, is an endless band which is returned to the extrusion nozzle upon separation from the coupling element, while the extrusion nozzle is fed by an extrusion or plastification screw of the type conventionally used in the extrusion of synthetic resins. Advantageously, a spacer strip is disposed below the die strip and preferable between a pair of such die strips whose cavities or cutouts are congruent and registering, so that each head is of a bipartite nature and is integrally bonded with a rib of the same synthetic resin formed continuously along the edge of the support band from which the heads laterally project. This spacer element defines the bottom or inner face of the row of heads while a further layer of synthetic resin overlies the die strip and is severed therefrom by material-removal operations to release the encased die strip.

When the present invention is applicable to the production of coupling elements alone, the entire die strip is encased in the thermoplastic resin and the excess layers are shaved from the die strips parallel to the planes of the broad surfaces thereof. In this case, the synthetic-resin bodies or ribs running along the longitudinal edges of the die strips may remain to bond the coupling heads together. Coupling elements of this character can be stitched or otherwise fixed to the support band. However, it is a preferred aspect of this invention that the support band be fed through the extrusion die concurrently with at least and preferably two die strips, (e.g. separated by a spacer strip of the character described, so that the synthetic resin extrudes into and through the support band and the coupling elements on the opposite sides of the support end are fused into a single unitary and integral member which is in effect permanently bonded with the support band. In this case, only the outer faces of the die strips need be shaved to remove the excess layers and release the die strips, the spacer strip defining a floor for both sets of cavities. It has been found to be desirable, subsequent to the extrusion operation, to pass the single dip strip or the multistrip assembly through a pair of calendering rollers or other compression means which apply pressure to the still-plastic synthetic resin in the direction transverse to the band and thereby densify the thermoplastic material in the cavities and ensure complete filling of the latter.

It may be noted that the present invention has a substantial advantage over earlier methods wherein the coupling element or the individual coupling heads were formed by injection-molding in closable bipartite or multipartite molds. Such systems were discontinuous and led to imprecise positioning of the coupling heads and often to defects in individual coupling heads. By contrast, the present method is continuous and operates with open cavities, i.e. cavities which are not only open laterally but also are fully exposed from above and below the die strips as is the case with cutouts. Additionally, the complete or substantially complete encapsulation of the die strip in the extruded synthetic resin can be carried out with conventional-type extrusion heads of the kind used in coating wires or in the manufacture of cables, thereby necessitating less complex equipment for the present process than has been necessary for earlier systems in which the coupling elements were molded in place. The die strip also acts as a core, when fully encased in the manner described, and stiffens the body until the assembly is cooled sufficiently to sever the excess layers and release the die strip or die strips.

Whereas mention has been made earlier of the shaving of the "excess" layer from the extruded thermoplastic resin encasing the die strip, it will be understood that other techniques to effect removal of this layer can be used. Thus the layer may be removed by ablation using sandblasting or shotpeening methods, by abrasion with files, grinding wheels or the like, or by chipping, electric-wire cutting or the like.

According to a further feature of this invention, each die strip is provided with a respective row of said cavities or cutouts along with opposite longitudinal edges whereby a pair of coupling elements may be formed simultaneously. Thus, on removal of the core formed by the die strip, the interconnected coupling heads disposed along the opposite longitudinal edges of the die strip will be separated from one another and constituted as individual coupling elements.

The above and other objects, features and advantages of the present invention will become more readily apparent from the following description, reference being made to the accompanying drawing in which:

FIG. 3 is a plan view of the extruded body formed with the die strip of FIGS. 1 and 2 and adapted to be transformed into a pair of coupling elements of the type which may be attached to a support band by stitching or the like;

FIG. 4 is a cross-sectional view taken along the line IV—IV of FIG. 3;

FIG. 12 is a greatly enlarged perspective view diagrammatically illustrating another slide fastener half according to this invention;

FIG. 13 is a cross-sectional view taken along the line XIII—XIII of FIG. 12 but showing the relationship of the coupling elements when the slide fastener is closed, i.e. when a second coupling element engages the coupling element of FIG. 12;

FIG. 13A is a similar section of another embodiment;

FIG. 14 is a cross-sectional view taken along the line XIV—XIV of FIG. 12;

FIG. 15 is a perspective view of the extruded body used in making the slide-fastener half of FIGS. 12—14;

FIG. 17 is a perspective view of a slide-fastener half made by the system of the present invention;

FIG. 18 is a cross-sectional view taken along the line XVIII—XXVIII of FIG. 17;

FIG. 19 is a perspective view of another embodiment;

FIG. 20 is a cross-sectional view taken along the line XX—XX of FIG. 10 and illustrating another characteristic of this invention;

FIG. 21 is an axial cross-sectional view, partly in diagrammatic form, illustrating an extrusion head for the formation of coupling elements upon a support band in accordance with the present invention;

FIG. 25 is a perspective view illustrating the step whereby the excess layer is removed in accordance with the aspect of the invention described in connection with FIGS. 21-24.

Figure 1:
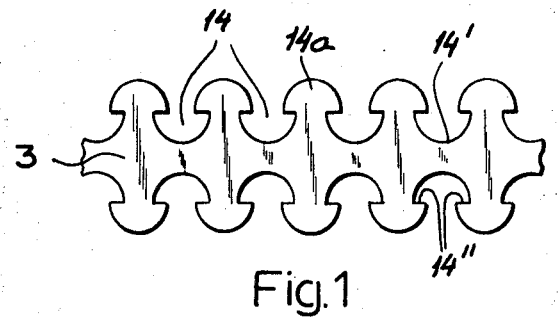
FIG. 1 is a plan view of a fragment of a die strip in accordance with the present invention.
Figure 2:
FIG. 2 is a side-elevational view of this die strip.

In FIGS. 1 and 2 I show a die strip 3 which is provided with laterally open cavities 14 of a configuration and spacing complementary to the configuration of the heads of the coupling element to be formed therein and with cruciform lateral projections complementary to the corresponding interhead space.

Thus, the cavities 14 have semicircular inner portions 14' which terminate in shoulders 14" adapted to constitute lateral projections from the heads. The cavities 14 are, moreover, symmetrically formed on opposite longitudinal edges of the die strip 3 which is here illustrated as a fragment of an endless or continuous member.

On each side of the die strip a respective coupling element can be formed. The lateral projections 14a of the die strip, between the cavities 14, are of a configuration complementary to that of these cavities and thus correspond to and are congruent with the heads, thereby imparting a cruciform configuration to the die strips in the plane of the coupling element formed thereon.

These projections 14a form, in the molded coupling elements, respective recesses between the head in which the heads of the coupling element of the other slide-fastener half may be received.

The die strip 3 is, moreover, formed from a heat resistant material to which the synthetic resin 20 is not readily adherent and may, therefore, be composed of polytetrafluoroethylene (Teflon). The cavities 14 are constituted as cutouts in the die strip so that they are not only laterally open but extend through the entire thickness $t$ of the die strip. Each of the coupling heads, therefore, will have a thickness corresponding to the thickness $t$ of the die strip 3.

According to one aspect of this invention, the die strip 3 is used to produce a coupling element which may be attached to the support band by conventional means. To this end, the die strip 3 is embedded (FIGS. 3-5) in a synthetic-resin layer 20 here shown to completely encase the die strip 3 with "excess" layers 20a and 20b upon the opposite broad faces of the die strip and layers 20c and 20d along the longitudinal edges thereof.

Figure 11:
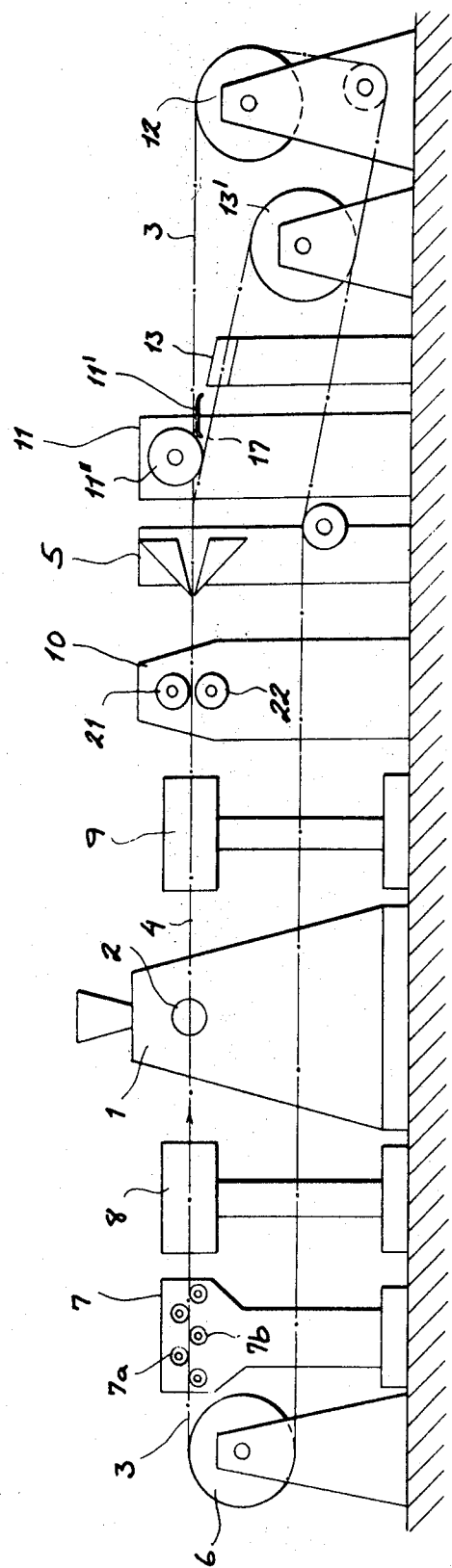
FIG. 11 is a diagrammatic elevational view of an apparatus for producing the coupling elements of the present invention.

The thermoplastic synthetic resin 20 is extruded around the die strip 3 while the latter is passed continuously through an extrusion die (illustrated in FIG. 6 or FIG. 21), constituting part of an apparatus for continuously making the coupling elements as shown in FIG. 11.

The die strip 3 is centered as a core in the extrusion 4. It will be understood, however, that layers of the synthetic resin may also be applied only to the surfaces of the die strip in the extrusion step, and thereafter can be pressed into the cavities 14. Furthermore, the die strip 3 can be disposed eccentrically within the extrusion 4.

Figure 7:
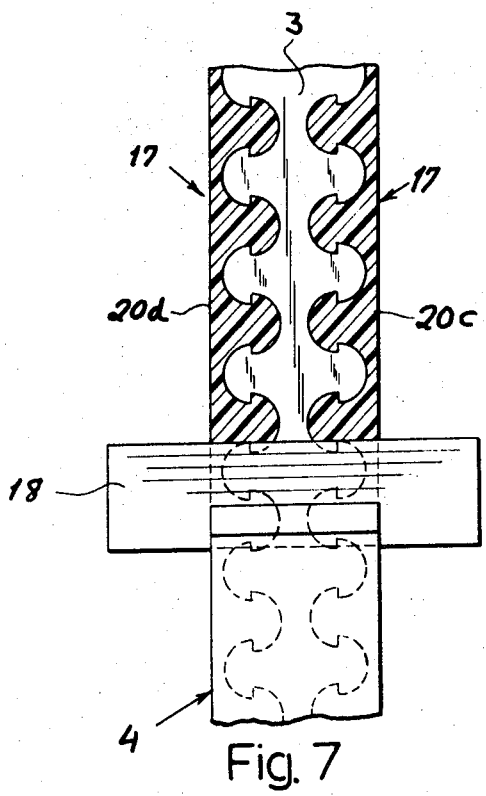
FIG. 7 is a diagrammatic plan view illustrating the removal of a layer of the extrusion of FIGS. 3—6 to free the die strip.
Figure 8:
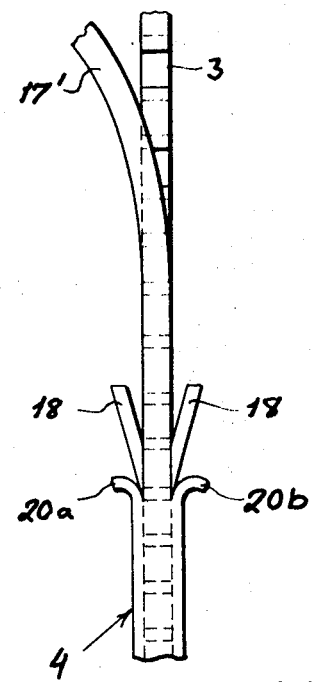
FIG. 8 is a partly-sectional side-elevational view diagrammatically illustrating this step.

Upon stripping of all or part of the layers 20a and 20b (FIGS. 7 and 8) from the extrusion 4 along the surfaces of the die strip 3, a pair of coupling elements 17 whose heads 15 are complementary in configuration and spacing to the cavities 14 are recovered. In this system, the excess layers 20a and 20b are removed by shaving (e.g. with a blade 18) prior to complete hardening of the synthetic resin, but after initial setting thereof.

Figure 9:
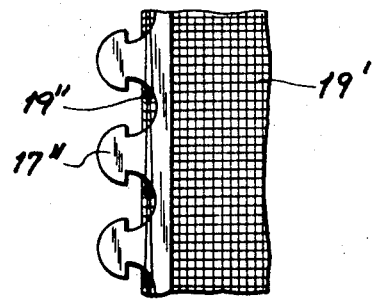
FIG. 9 is a plan view of a fragment of a slide fastener half in which the coupling element of FIGS. 8 and 9 is affixed to a support tape.

The coupling elements 17 can be recovered from the die strip 3 by removing the coupling elements laterally as shown at 17'. Coupling elements of this type can be attached to a fabric band 19' as illustrated in FIG. 9 for the coupling element 17". In this case, welt or chain stitch 19" is used to connect the coupling element to the support band. The heads 15 of each coupling element 17 are joined together in continuous chains by bands 20c and 20d of the synthetic-resin material constituting the excess disposed along the longitudinal edges of the die strip 3 (see FIG. 4).

Figures 3, 4:
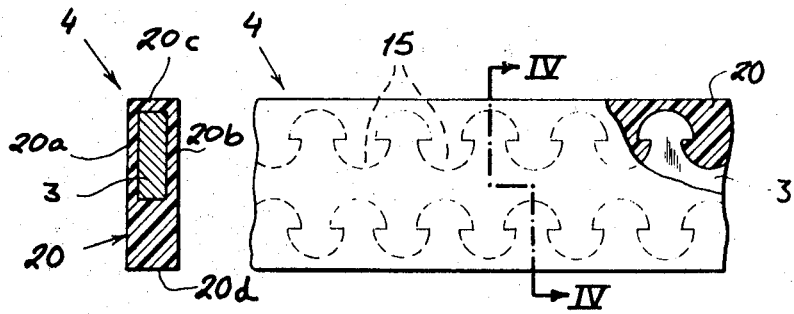
Figure 5:
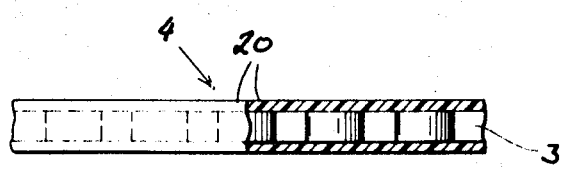
FIG. 5 is a side-elevational view, partly broken away, of the body of FIGS. 3 and 4.
Figure 6:
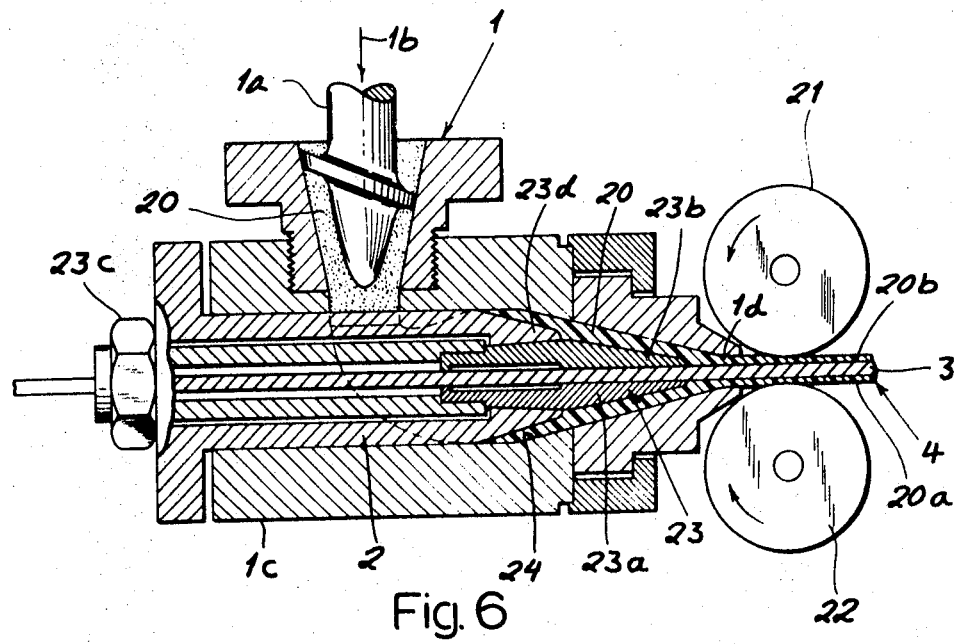
FIG. 6 is an axial cross-sectional view, partly in diagrammatic form, of an extrusion nozzle for forming the body of FIGS. 3—6 and using the die strip of FIGS. 1 and 2.

In FIG. 6 I show a system for extruding the body of FIGS. 3 and 5 in a continuous manner, this extrusion head being adapted to be used in the continuous arrangement of FIG. 11. The extrusion head here comprises a worm-type extrusion press 1, whose transverse plastifying worm 1a advances a synthetic thermoplastic in the direction of arrow 1b to the nozzle 1c.

The plastification and extrusion screw arrangement is conventional and may be of the type used in sheathing cores in the cable or wire industry.

The nozzle 1c is provided with a head 2 through which the single dip strip 3 or a multipartite die strip (as described below) is continuously passed. The head is also provided with a centering device or guide 23 which locates the die strip 3 at the center of the extrusion outlet 1d or at any eccentric position chosen for the extrusion.

An annular cavity 24 surrounds the centering device 23 and delivers the liquefied resin to the outlet 1d thereby forcing the resin into the cavities 14 and encapsulating the die strip 3 in a sheath of this resin (FIG. 4). Upon emergence of the extrusion 4 from the nozzle 1c, a pair of compacting rollers 21 and 22 compress the synthetic resin layers 20a and 20b firmly into the cavities 14, thereby ensuring complete filling of the latter. The centering device 23 is a multijaw arrangement whose jaws 23a and 23b are located about the die strip 3 by a nut 23c and a conical sleeve 23d in the manner of a jaw-type chuck, thereby preventing reverse flow of synthetic resin through the centering device 23.

Downstream of the extrusion head 1c (FIG. 6) I provide the severing means 18 etc. which shave the excess layers 20a and 20b away from the die strip 3 whereby the latter is released to separate the coupling elements from the die strip.

FIG. 11 shows, in diagrammatic form, a continuously operating apparatus for making coupling elements of this character. The apparatus comprises basically the extrusion press 1 and nozzle or head 2 (FIG. 6) which extrudes a liquefied thermoplastic material into and around the endless die strip 3 and thereby forms the extrusion 4. The extrusion 4 emerging from the nozzle 2 passes through the shaving device 5 (FIGS. 7 and 8) at which respective blades sever the broad cover layers 20a and 20b from the extrusion 4 and thereby permit the coupling elements 17 to be deflected from the die strip 3 which is returned over a roller 11 to the starting side of the apparatus. Upstreams of the separation means 5, a compaction station 10 is provided with the aforedescribed rollers 21 and 22 which compress the synthetic resin material into the cavities 14. Ahead of the extrusion means 1, 2 I provide a roller 6 or drum from which the endless die strip 3 is paid off and passes through a straightening device 7 whose rollers 7a and 7b remove kinks from the die strip 3. Thereafter, the die strip 3 is preheated in a muffle oven 8 and passes into the extrusion means 1, 2.

The extrusion 4, emerging from the extrusion means 1, 2, partially sets in a cooling head prior to its passage between the rollers 21 and 22 in the system illustrated in FIG. 11. It has been found, however, that sufficient setting of thermoplastic occurs immediately upon emergency of the extrusion from the nozzle whereby the cooling means can be eliminated between the rollers 21, 22 and this nozzle as shown in FIG. 6. Thus, the cooling means 9 can also be located between the compaction means 10 and the separating means 5. Further cooling arrangements can be disposed downstreams of the separating means 5 to ensure substantially complete hardening of the thermoplastic coupling elements 17 before they are withdrawn. The takeup roller 12 diverts the die strip 3 in a closed path to the inlet side of the apparatus from a deforming device 11 in which a guide 11' supports the die strip 3 while a pair of rollers 11" deflect the coupling element 17 downwardly to a closure device 13 adapted to interconnect the coupling elements when the latter are integrally formed with their respective bands as will be described in greater detail hereinafter. A takeup reel 13' recovers the interconnected slide-fastener halves of the two strands of coupling elements.

Figure 10:
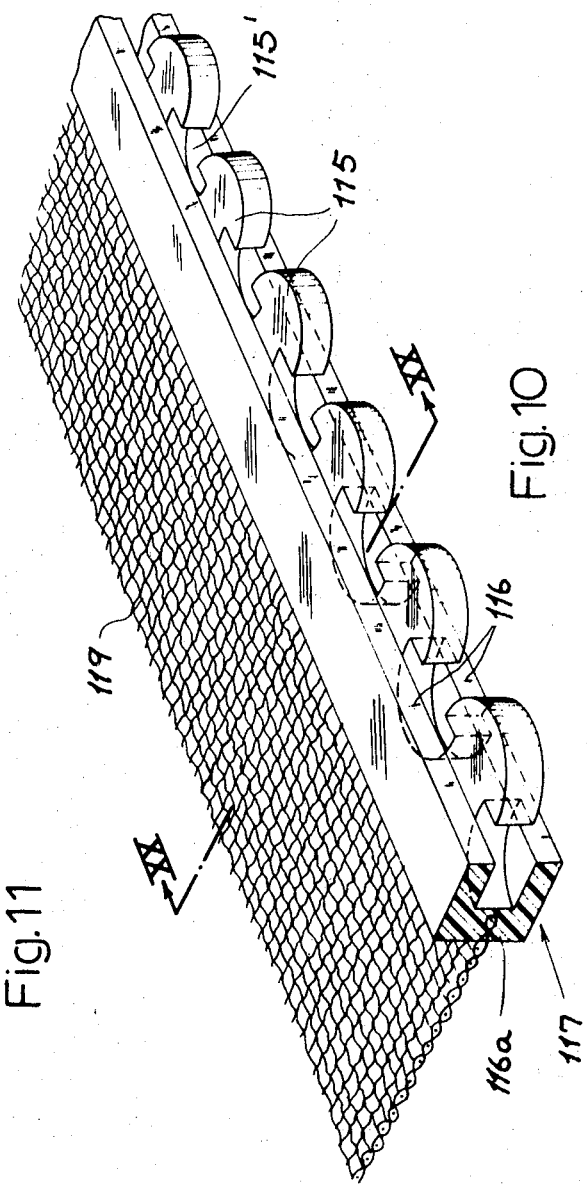
FIG. 10 is a perspective view illustrating a completed slide-fastener half in accordance with another aspect of this invention.
Figure 16:
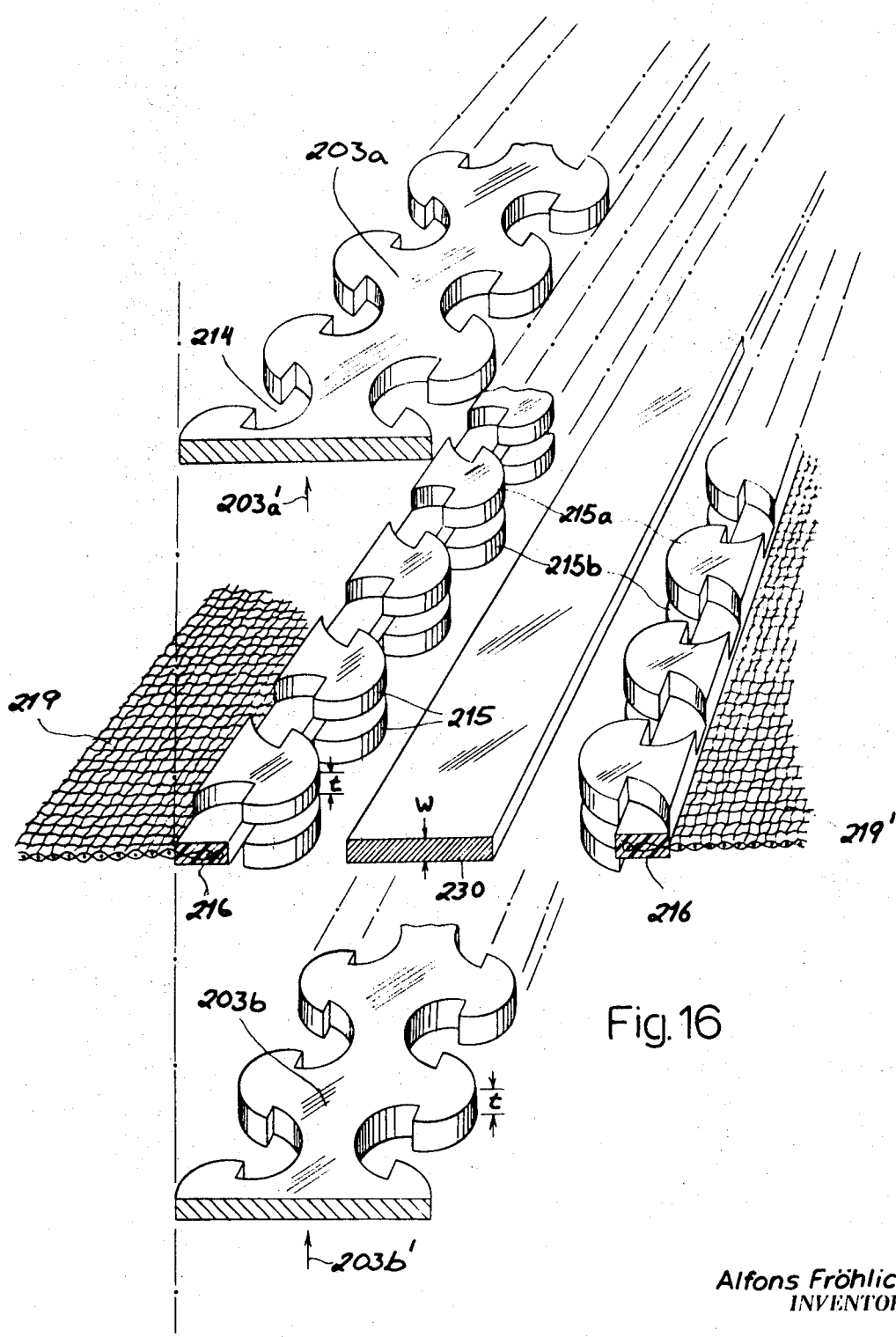
FIG. 16 is an exploded perspective view of this body after removal of the "excess" layers.

As indicated earlier, the coupling element 17 can be formed integrally with the support band as illustrated in FIG. 10. In this embodiment a fabric support band 119 is shown to be provided with an extruded connecting element 117 whose heads 115 are formed integrally with a pair of ridges 116 extending along opposite sides of the support band 119 and serving as guides for a conventional slider. The heads 115 are of the configuration of the cavities 14 of the die strip 3 and are formed by extruding the synthetic resin about the die strip with partial removal of the upper and lower excess layers (see FIGS. 19 and 20).

The ribs 116 merge at 116a in the region at which the thermoplastic penetrates the open-mesh structure of the fabric support band 119. The heads 115 thus project laterally beyond the ridges 116 and define openings 115' between them which are adapted to receive the coupling heads of a complementary slide-fastener half.

The bodies 116 act as stiffening elements as well as guides for the slider and increase the strength with which the coupling element is affixed to the support band 119. It will be understood that the heads 115 here are generally coplanar with the fabric 119 while the ribs 116 form beads on opposite sides of this fabric. In place of an open mesh fabric whose edge is permeated by the synthetic resin, it is also possible to make use of a synthetic-resin foil which is extruded concurrently with the formation of the coupling element. In this case, I have found it advantageous to incorporate reinforcing cords or wires into the ridges 116.

Moreover, perforated foils can also be used as support bands for the present purpose and to this end the support band is provided with throughgoing openings into which the synthetic resin is injected so as to ensure that the ridges 116 are integral with one another.

In FIGS. 12-14 I show another embodiment of this invention wherein the fabric band 219 has one longitudinal edge encased in a barlike member 216 of the extruded synthetic resin to form a guide for the respective slider, this bar or rib lying in the plane of the fabric band 219. The bar 216 is flanked by a pair of coupling members 215a and 215b which are spaced apart essentially by the width w of the rib 216 and a spacer strip to be described in greater detail hereinafter.

The members 215a and 215b of each head 215 are congruent and aligned with one another and form between them openings 215' adapted to receive the complementary bifurcated heads of the other coupling element. The lateral formations 215" overhanging the openings 215', grip the heads of the complementary coupling element when the slide-fastener halves are matingly interengaged.

The system of FIG. 10 is designed to receive at least part of the heads of the complementary coupling element between the ridges 116 and thereby prevent lateral separation of the interconnected elements whereas in the device of FIGS. 12-14 the bifurcated heads 215 embrace the rib 216 of the mating coupling element to similarly prevent lateral dislocation.

In FIG. 15, I show the extrusion used to make a slide fastener half as illustrated in FIGS. 12-14. In this arrangement, a pair of die strips 203a and 203b are disposed on opposite sides of a pair of fabric bands 219 and 219' so that edge portions 219a and 219a' of these fabric bands are sandwiched between the die strips 203a and 203b. A spacer strip 230 is disposed between the die strips 203a and 203b and centrally of these die strips along the edges 219a and 219a' of the bands 219 and 219' so as to form pockets 231 in which these edges are disposed. The pockets 231, of course, communicate with the cavities 214 of the overlying and underlying die strips 203a and 203b and are filled with the resin; when the assembly illustrated in FIG. 15 is passed through the extruder it is coated with the synthetic resin 220 which fills the cavities 214 and encases the die strips 230a and 230b. The die strips are thus held in place by excess layers 220a and 220b of the synthetic resin and are located eccentrically but symmetrically within the extrusion on opposite sides of the fabric 219 and 219'.

When the excess layers 220a and 220b are severed or shaved from the extrusion (see FIGS. 7 and 8) in a continuous manner via an apparatus such as that illustrated in FIG. 11, the upper and lower die strips 203a and 203b can be removed as represented by the arrows 203a' and 203b'. The support bands 219 and 219' are thus found to be separable from the metallic (stainless steel) or polytetrafluoroethylene spacer strip 230 whose thickness w corresponds to the thickness of the rib 216 interconnecting the heads 215 and to the width of the gap between the coupling members 215a and 215b of each head. Similarly, the thickness t of the respective die strip 203a or 203b determines the thickness of the members 215a and 215b of each head. The configuration of the rib 216, in which the fabric is embedded, is determined by the cross section of the pockets 231.

As can be seen from FIG. 13, the coupling members 215a and 215b forming each head of the right-hand slide fastener half 219' embraces the rib 216 of the left-hand coupling half so that transverse relative dislocation of the coupling heads as represented the the arrows A is precluded. In the arrangement of FIG. 13A, the support band 319 is shown to be integrally extruded with the longitudinally extending rib 316 and the coupling members 315a, 315b forming each coupling head 315.

It will be understood also that the woven bands 219, 219' can be considered to represent knitted open-mesh fabrics in which the synthetic resin material passes through the openings of the band to ensure film bonding of the coupling heads to the band. When the synthetic-resin material is extruded to form the band 319, a fabric such as that shown at 219 may be inlaid within the extrusion so as to be fully encased in the synthetic-resin foil formed by the extrusion step and serve as a reinforcing web in the latter.

In FIGS. 17 and 18, I show a modified slide-fastener arrangement adapted to be made by the present technique and wherein the transverse dislocating forces are resisted by formations built into the head structure. In this embodiment, the coupling element 417 extending along the edge of the band 419 and in part molded therearound via the longitudinal rib 420c is provided with a multiplicity of heads 415 separated by spaces 415' of complementary configuration, the spaces and heads being adapted to be interleaved with the heads and spaces of a complementary slide-fastener coupling element.

The coupling element is formed in the manner described with reference to FIGS. 1–6, for example, in an open-cavity die strip, the walls of the cavities being provided with a suitable configuration as will become apparent hereinafter.

The heads 415 are here shown to be reversely beveled so as to have inwardly extending grooves of V-section which are complementary to the outwardly beveled V-section ridge 415b of the spaces 415' between the heads 415. Thus when a pair of complementary coupling elements of mating slide-fastener halves are joined by movement of the slider and the coupling elements have the formations illustrated in FIG. 17, the confronting edges of the mating heads and spaces will hug one another in close-fitting or formfitting relationship as illustrated in FIG. 18.

Thus the embodiment of FIG. 12 prevents transverse dislocation of the coupling elements by virtue of bifurcated heads which embrace a continuous rib, while the embodiment of FIGS. 10, 19 and 20 avoids such transverse dislocation by providing a pair of outer ribs which receive the heads of the mating slide fastener between them; the system of FIGS. 17 and 18 provides for ridges upon one of the coupling surfaces, (e.g. the coupling head or the female portion) and for a complementarily shaped recess in the other whereby engagement of the coupling heads in the female coupling members of the opposite coupling element will lock the slide fastener against such transverse dislocation.

In FIGS. 10, 19 and 20, I show how the transverse dislocation of the slide-fastener halves can be prevented by a pair of ridges disposed on opposite sides of the web or band and projecting outwardly so as to overlie and underlie the openings between the heads of the coupling element and, consequently, the heads of the other slide fastener received in these openings. In this embodiment, the extrusion 104 comprises a synthetic-resin mass 120 completely encasing the die strip 103 and embedding at least the longitudinal edge of the support bands 119, 119' in the mass of synthetic resin. The longitudinal edges 120c and 120d of the extrusion 104 are thus reinforced by the bands 119, 119'.

To form the ridges 116 flanking the heads 115 of the coupling element 117, the excess layers 120a and 120b are cut away by the blade 118 over a width W less than the width W' of the die strip and also less than the width W" of the extrusion 104. This removal of the excess layer is facilitated by cutting into the layer (e.g. via rotary blades 118a) along longitudinal lines inwardly of the outer edges of the extrusion 104.

The coupling element 117' can then be removed by drawing it to the right (FIG. 19) whereupon the die strip 103 is similarly recovered, the ridges 116 being deflected during the separation operation. From FIG. 20, it will be apparent that the synthetic resin material forming the ridges 116 flanks the head 115 and is interconnected by the strip 120c along the longitudinal edge of the extrusion 104. Here the band 119 is shown to be provided with openings 119a through which the resin of the ridges 116 passes so that these ridges are formed unitarily (i.e. in one piece) with the heads 115 and with one another.

The production of slide-fastening heads or the coupling elements thereof in a rapid manner is best effected with a system whose overall construction has been described and illustrated in connection with FIG. 11 and whose extrusion head is constituted either as illustrated in FIG. 6 or as illustrated in FIG. 21, the latter being employed when the coupling element is to be bonded directly to the support tapes. In FIG. 21, I show an extrusion head 50 of the transverse type, i.e. wherein a nozzle 51 extrudes a band of synthetic resin in the general longitudinal direction represented by arrow B but the thermoplastic and liquefied resin is supplied to the nozzle 51 by an extrusion screw 52 in a plastification chamber 53 in the direction of arrow C, i.e. in a direction transverse to the direction of the extrusion.

According to this invention, a chucklike centering body 54 is mounted by belts 55 to the extruded head 50 and has its jaws tightenable by a nut 56 to prevent reverse leakage of the extruded resin rearwardly into this chuck. The centering device 54 serves to feed the web or webs 119 and 119' (see FIG. 2) through the extrusion die 51 for encapsulation in the synthetic-resin material 20 whose flow is represented in broken lines in FIG. 21.

Figure 22:
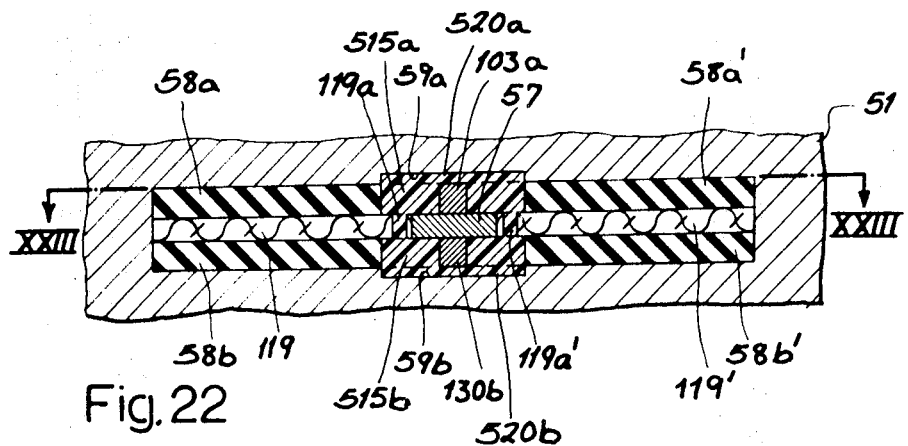
FIG. 22 is a cross-sectional view taken along the line XXII—XXII of FIG. 21.
Figure 23:
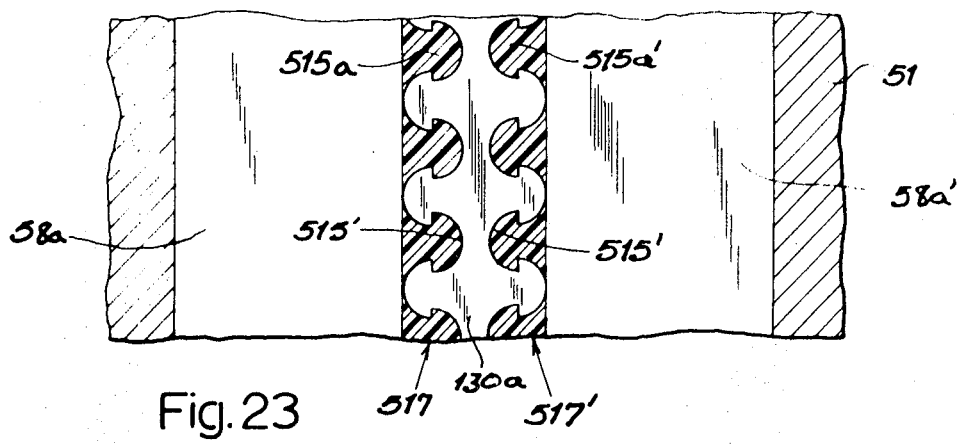
FIG. 23 is a cross-sectional view taken generally along the line XXIII—XXIII of FIG. 22.
Figure 24:
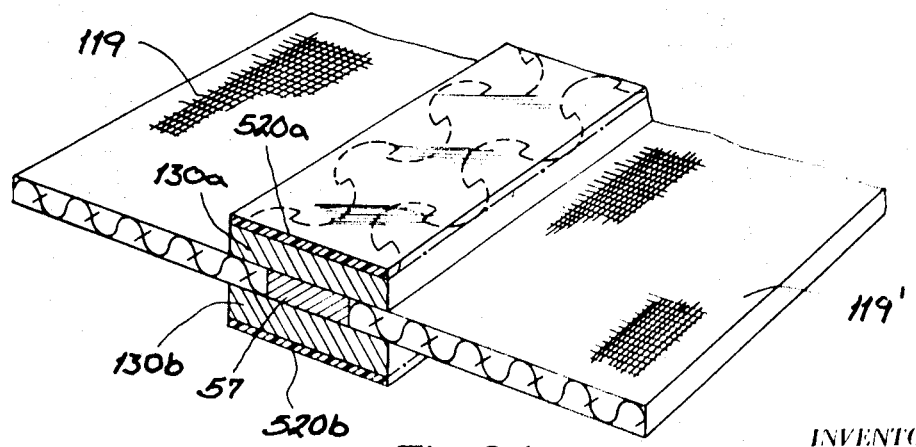
FIG. 24 is a fragmentary perspective view of the extruded body obtained with the apparatus of FIGS. 21-23.

As can be seen from FIGS. 22 and 24, the fabric bands 119 and 119' are respectively disposed on opposite sides of the spacer strip 57 while a pair of endless metal belts 58a and 58b are substantially coextensive with the bands 119 and 119' in those regions thereof laterally of the die strips 103a and 103b; the belts are contiguous with the latter and tangent to the lateral projections of the die strips which are of cruciform section. Thus the assembly passing through the die nozzle 51 is constituted by the spacer strip 57 which separates the die strips 103a and 103b, the webs 119 and 119', and the pairs of belts 58a, 58b and 58a', 58b' which flank the die strips 103a and 103b and which have a thickness assembly corresponding to the thickness of these die strips.

The bands 119 and 119' are of an open-mesh construction or otherwise are provided with openings 119a and 119a' through which the extruded synthetic resin 20 passes to bond the heads 515a, 515b, and 515a', 515b' together, respectively as each of the coupling elements 517 and 517' are produced.

The die nozzle 51 is formed with a recess 59, 59a, 59b on each side of the die-strip assembly to form the respective overlying and underlying excess layers 520a and 520b. The latter are represented in dot-dash lines in FIG. 24 and are removed as indicated in FIG. 25 via the blades 518.

The extrusion-head assembly of FIG. 21 thus includes a pair of conveyor rollers 60 about which the belts 58a, 58b etc. pass, the belts being diverted from the extrusion 504 downstream of a pair of compression rollers 61 which perform a function similar to that of the rollers 21 and 22. Such rollers operate to increase the conformity of the moldable material with the cavities of the die strip and the uniformity of the extrusion 4, 104, 504 etc. It has been found also that this compression molecularly orients the synthetic resin, thereby reducing its tendency to subsequent shrinkage and increasing its tensile and breakage strength. Furthermore, the speed of production of slide-fastener assemblies of this character is limited only by the capacity of the extruder and the system is fully continuous without any of the difficulties hitherto involved in intermittent injection molding of coupling elements.

I have found that the inherent shrinkage of the synthetic material during cooling thereof, rather than constituting a problem leading to alteration of the spacing of coupling elements and the configuration of the male and female members, actually increases the precision thereof; this effect appears to be due to the partial shrinkage of the encapsulating mass inwardly to press the synthetic-resin material more firmly into open cavities of the die strip. The latter also takes up the tensile stresses arising from shrinkage during cooling. Downstream of the head illustrated in FIG. 21, I provide a shaving means as illustrated in FIG. 11 as well as means for separating the die strip from the coupling elements and returning it to the extrusion head.

I claim:

1. In a method of making a slide fastener wherein a pair of slide-fastener halves each are provided with respective support bands and a coupling element affixed to said support band and formed with a plurality of spaced-apart heads matingly interengageable with the heads of the coupling element of the other support band, the improvement wherein each of said coupling elements is formed by:
   a. continuously extruding a thermoplastic synthetic resin entirely around a flat continuous die strip provided with laterally open cavities of a configuration complementary to the configuration of said heads and spaced apart along said die strip with a spacing corresponding to the spacing of said heads and at least partially solidifying the synthetic resin about the die strip;
   b. continuously severing a band of the synthetic resin from the continuous extrusion of step *a* generally parallel to the die strip and flush therewith; and
   c. thereafter separating the die strip from the heads formed in said cavities.

2. The improvement defined in claim 1 wherein said thermoplastic synthetic resin is molded around said die strip in step *a* whereby said die strip is flanked by a body of said synthetic resin interconnecting the heads in said cavities and by a layer of said synthetic resin overlying said die strip, said die strip being separated from the heads formed in said cavities and said body of synthetic resin by cutting away said layer from said body and from the synthetic resin in said cavities, and thereafter withdrawing said strip.

3. The improvement defined in claim 1 wherein said die strip is formed along each of its longitudinal edges with a respective row of said cavities whereby a pair of said coupling elements is formed simultaneously by injecting said synthetic resin into said cavities.

4. The improvement defined in claim 1 wherein said die strip is endless and is returned to step *a* for further extrusion of thermoplastic synthetic resin into said cavities upon separation of said strip from the coupling element formed thereon, the coupling element and the die strip being separated continuously from one another and said synthetic resin being injected into the cavities of said die strip while said die strip is displaced continuously along a closed transport path.

5. The improvement defined in claim 1 wherein a respective support band is disposed adjacent said die strip and said synthetic resin is molded at least in part onto the support band, thereby uniting the coupling element formed on said die strip with the respective support band.

6. The improvement defined in claim 1 wherein said support band of the respective coupling element is formed by extruding a flat tape of said synthetic resin integrally with the synthetic resin masses in said cavities.

7. The improvement defined in claim 1 further comprising the step of compressing said thermoplastic synthetic resin into said cavities upon the injection of said resin therein in step *a* and prior to the separation of the coupling element from the die strip, said synthetic resin being pressed into said cavities in a direction transverse to said strip.

8. The improvement defined in claim 1 wherein each of said coupling elements is formed on the respective support band in step *a*, and wherein two spaced-apart die strips having registering cavities and of substantially identical configuration are disposed on opposite sides of the support band to which the coupling element is to be attached and are displaced together with said support band through an extrusion nozzle wherein said synthetic resin encases both said die strips and a marginal portion of the support band in the region of said die strips, both said die strips being separated from the coupling element whereby the heads formed in the respective concavities are unitarily bonded with one another and are affixed to the support band.

9. The improvement defined in claim 8 wherein a spacer strip is disposed between said die strips in the region of the registering heads and alongside an edge of said support band and is separated from the support band, whereby the heads formed in the cavities of the respective die strips protrude laterally of the support band to which they are bonded and are separated by a gap corresponding essentially to the thickness of said spacer strip.

10. The improvement defined in claim 9 wherein the support band is provided with throughgoing openings and said synthetic resin is forced through these openings to interconnect the heads of opposite sides of the band.